Figure 1:
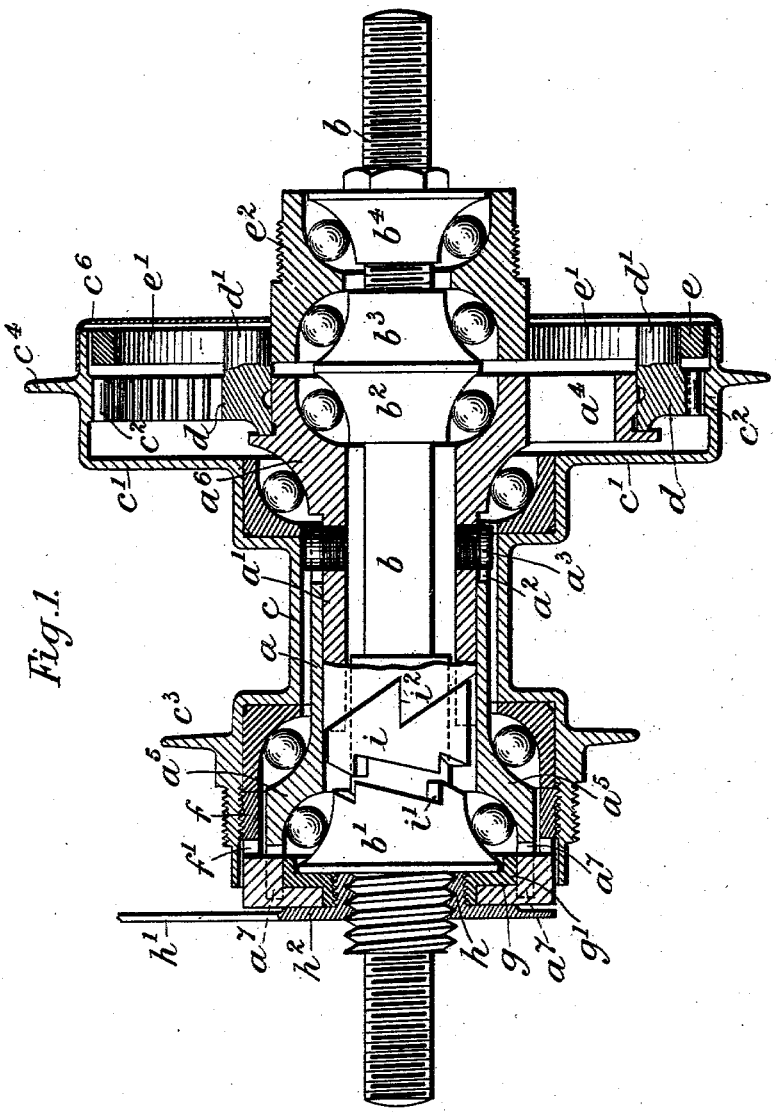

No. 720,800. PATENTED FEB. 17, 1903.
F. C. HASTE & J. A. WILDING.
SPEED GEAR FOR REAR DRIVEN BICYCLES.
APPLICATION FILED JUNE 9, 1902.

NO MODEL. 3 SHEETS—SHEET 1.

WITNESSES.
Samuel Percival
Herbert C. Bolwell

INVENTORS.
Frederick Charles Haste
James Armstrong Wilding
By their Attorneys.
Wheatley & MacKenzie No. 720,800. PATENTED FEB. 17, 1903.
F. C. HASTE & J. A. WILDING.
SPEED GEAR FOR REAR DRIVEN BICYCLES.
APPLICATION FILED JUNE 9, 1902.
NO MODEL. 3 SHEETS—SHEET 2.

WITNESSES.
Samuel Percival
Herbert C. Bolwell

INVENTORS.
Frederick Charles Haste
James Armstrong Wilding
By their Attorneys.
Wheatley & Mackenzie No. 720,800. PATENTED FEB. 17, 1903.
F. C. HASTE & J. A. WILDING.
SPEED GEAR FOR REAR DRIVEN BICYCLES.
APPLICATION FILED JUNE 9, 1902.
NO MODEL. 3 SHEETS—SHEET 3.

WITNESSES.
Samuel Percival
Herbert C. Bolwell

INVENTORS.
Frederick Charles Haste
James Armstrong Wilding
By their Attorneys.
Wheatley & Mackenzie

UNITED STATES PATENT OFFICE.

FREDERICK CHARLES HASTE, OF LONDON, AND JAMES ARMSTRONG WILDING, OF OLD CHARLTON, ENGLAND, ASSIGNORS TO THEMSELVES, AND CHARLES WILLIAMSON MILNE, OF BAYSWATER, ENGLAND, AND WILLIAM JAMES DAVY, OF LONDON, ENGLAND.

SPEED-GEAR FOR REAR-DRIVEN BICYCLES.

SPECIFICATION forming part of Letters Patent No. 720,800, dated February 17, 1903.

Application filed June 9, 1902. Serial No. 110,384. (No model.)

*To all whom it may concern:*

Be it known that we, FREDERICK CHARLES HASTE, residing at Crown Court, Old Broad street, London, and JAMES ARMSTRONG WILDING, residing at Old Charlton, county of Kent, England, subjects of the King of Great Britain and Ireland, have invented certain new and useful Improvements in or Connected with Speed-Gears Specially Applicable to Rear-Driven Bicycles; and we do hereby declare the following to be a full, clear, and exact description of the invention, such as will enable others skilled in the art to which it appertains to make and use the same.

This invention for improvements in or connected with speed-gears specially applicable to rear-driven bicycles has for its object to provide a simple and efficient speed-gear that shall occupy a small space and shall also form when applied to a bicycle the hub of the driven wheel and at the same time allow of any size of solid or free chain-wheel being used.

In a gear constructed according to this invention an inner sleeve made in two telescopic parts, but rotating together, is mounted on ball-bearings on the fixed axle and is provided at the driving end with an eccentric disk or sheave. The wheel-hub proper is mounted on ball-bearings on the inner sleeve between the eccentric disk and an enlargement on the other end of the sleeve. A ring having external teeth is mounted on the eccentric disk and gears into internal teeth fixed axially inside an enlargement on the hub. The open end of the enlargement on the hub is closed by a free disk mounted on ball-bearings on the end of the fixed axle and carrying the collar for the usual chain-wheel. One or more projections on the toothed ring work in slots in the free disk.

It will readily be seen that if the telescopic sleeve is prevented from rotating and the chain-wheel is driven it drives the free disk and by the projections the toothed ring and through it the hub at a reduced speed proportional to the difference in diameter between the toothed ring and the internal teeth in the enlargement of the hub. If, however, the telescopic sleeve is locked to the hub and both are free to rotate, the chain-wheel will drive the sleeve and hub as a whole at the speed of the chain-wheel. The locking is effected by a ring rotating on a cap screwing into a coarse (preferably a triplex) thread on a fixed piece or nut on the axle. The locking-ring has on the chain-wheel side teeth or projections adapted to gear with similar projections on the end of the hub and also recesses into which projections on the telescopic sleeve always enter. On the outer side the locking-ring has teeth adapted to engage with fixed teeth. If the locking-ring is moved to the right by slightly rotating the cap on its coarse thread, the sleeve and hub are locked together, while if it is moved to the left by rotating the locking-ring in the opposite direction the locking-ring is fixed and holds the telescopic sleeve while the hub is disconnected from it.

It will readily be understood that the locking-ring may be traversed by any other suitable form of mechanism.

Figure 2:
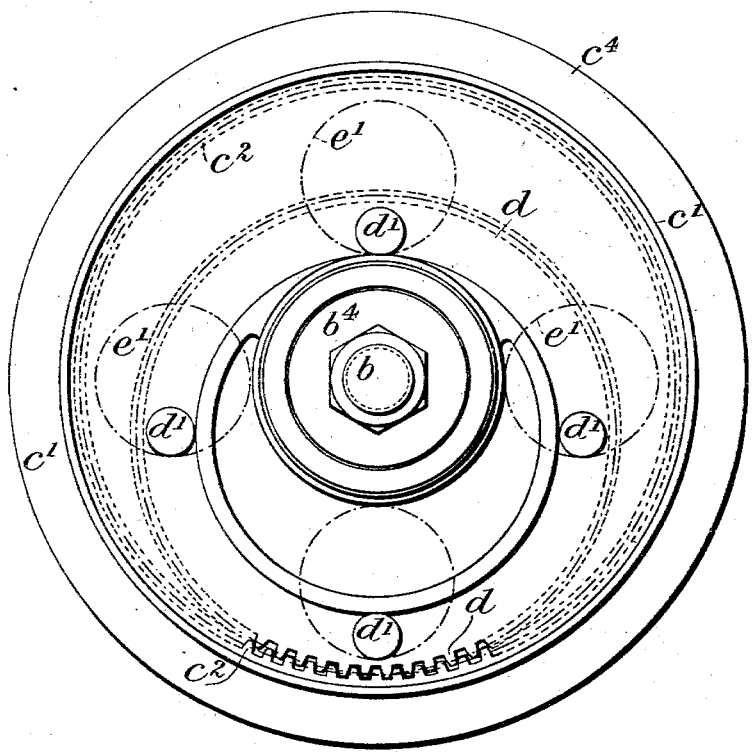
Figure 3:
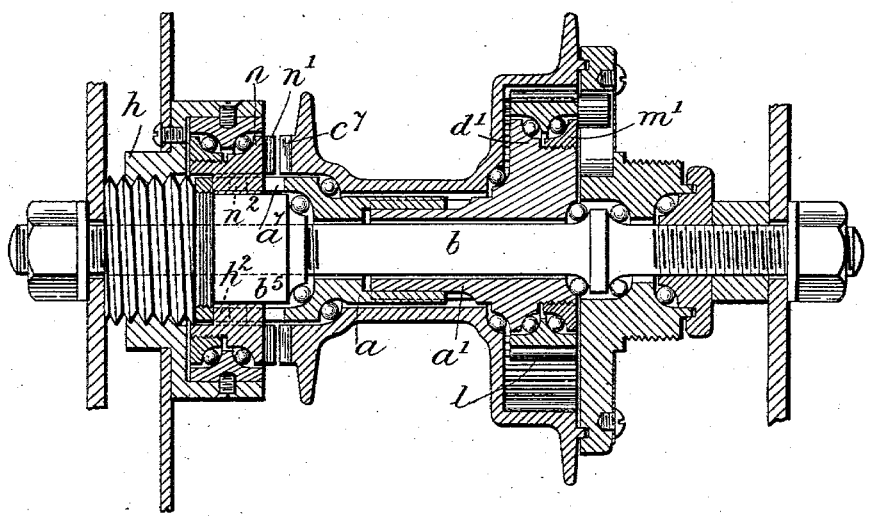

In the accompanying sheets of illustrative drawings, Figure 1 is a central longitudinal section of a two-speed gear constructed according to this invention. Fig. 2 is a side elevation, the dust-cover being removed. Fig. 3 is a similar view to Fig. 1, showing a slight modification of the gear in which all the revolving parts work on ball-bearings.

The inner sleeve is made in two parts $a$ $a'$, telescoping one into the other. Slots or grooves $a^2$ on the adjacent end of the part $a$ embrace studs $a^3$, fixed on the part $a'$. The parts $a$ $a'$ have thus a free telescopic movement, but are forced to rotate together.

The sleeve $a$ $a'$ rotates on the cones $b'$ $b^2$ on the fixed axle $b$, balls being inserted between the working surfaces. The cone $b'$ is fixed on the axle, while the cone $b^2$ can slide slightly on the axle. On the driving end the sleeve $a$ $a'$ is formed as an eccentric $a^4$.

The wheel-hub $c$ is mounted on the bearings $a^5$ $a^6$ on the sleeve $a$ $a'$ and has an enlarged chamber $c'$, surrounding the eccentric $a^4$ and provided with internal teeth $c^2$. The flanges $c^3$ $c^4$ serve to receive the heads of the spokes in the usual way. A toothed ring $d$ is mounted on the eccentric $a^4$ and gears into the teeth $c^2$ in the enlarged chamber of the hub $c$.

The chamber $c'$ is fitted at its open end with a drive-plate $e$, that rotates on the cones $b^3$ $b^4$. The cone $b^3$ is made in one with the cone $b^2$, and the cone $b^4$ is adjustable on the axle $b$. The plate $e$ is provided with holes $e'$ of the necessary shape, and pins $d'$ on the toothed ring $d$ take into these holes $e'$, so that the plate $e$ is driven at the same speed as the toothed ring $d$. The holes $e'$ are of the shape shown on account of the eccentricity of the ring $d$ and the plate $e$. The drive-plate $e$ carries the screwed collar $e^2$, serving for the attachment of the usual chain-ring or freewheel device.

In assembling the parts the hub $c$ is first mounted on the telescopic sleeve $a\ a'$. Then the sleeve is mounted on the axle, and the balls being in place the cones $b^3 b^4$ are slid on the axle. Then the drive-plate is mounted on the axle, and finally the cone $b^4$ is screwed on the axle and adjusted, this one adjustment adjusting all the bearings. A sleeve $h$ is screwed onto the end of the cone $b'$ with a very coarse or triple thread, so that a slight rotating movement of the sleeve gives a considerable longitudinal traverse. The sleeve is rotated by the arm $h'$. A locking-ring $g$, provided with two concentric series of holes, is mounted on the boss of the collar $g'$, screwing onto the sleeve $h$ between a collar $h^2$ on the sleeve $h$ and the collar $g'$. The ring $g$ is thus free to rotate, but is traversed longitudinally with the sleeve $h$.

The end of the hub $c$ remote from the chain-wheel is screw-threaded internally and is fitted with a ring $f$, provided with short projections or teeth $f'$, that take into the outer holes in the locking-ring when the sleeve $h$ is traversed toward the hub, but are free when the sleeve is traversed away from the hub.

The outer end of the part $a$ of the telescopic sleeve is provided with long teeth or projections $a^7$, that always engage with the inner series of holes in the locking-ring $g$.

It will be readily seen that if the sleeve $h$ be traversed toward the hub $c$ the telescopic sleeve $a\ a'$ and the hub $c$ will be locked together and that if the driving-plate $e$ be driven the hub will be driven at the same speed. If, however, the sleeve $h$ be traversed away from the hub $c$, the hub and the telescopic sleeve will be free to rotate independently. If now the driving-plate $e$ be driven, the tendency of the sleeve $a\ a'$ will be to rotate backward, and if it is prevented from rotating backward the hub $c$ will be driven at a reduced speed proportional to the difference in diameter between the toothed ring $d$ and the internal teeth $c^2$ of the hub $c$. The sleeve $a\ a'$ is prevented from rotating backward by a clutch mounted on the axle and which may be of any type that will allow the sleeve to move forward, but not backward. As shown, it consists of a ring $i$, free to slide and rotate on the axle and provided on either face with inclined teeth that are adapted to engage with corresponding teeth $i'$ $i^2$, the teeth $i'$ being formed on the end of the fixed cone $b'$ and the teeth $i^2$, that are double the length of the teeth $i'$, being formed on the end of the part $a'$ of the telescopic sleeve. If therefore the sleeve $a\ a'$ tends to move backward, the long inclines of the teeth $i^2$ force the ring $i$ to the left, so that it also gears with the teeth $i$ and so prevents any backward motion. If now the hub be driven forward, the long inclines of the teeth $i'$ force the ring sidewise to the right and out of gear. The teeth $i^2$ are always in gear. In use, therefore, if the sleeve $h$ is moved toward the hub $c$ the hub is driven at the high speed, while if the sleeve $h$ is moved away from the hub the hub is driven at the low speed. The front of the chamber $c'$ is covered by a dust-plate $c^6$. In this construction the whole of the parts except the toothed ring $d$, the clutch $i$, and the locking-ring $g$ revolve on ball-bearings.

In the modification shown in Fig. 3 the toothed ring $l$, similar to the toothed ring $d$, is constructed with an internal rib $d'$, forming two ball-races, as clearly shown. The eccentric is made with an adjustable ring $m'$ to enable the balls to be inserted and any wear of these bearings to be taken up. In this arrangement also the locking-ring $n$ is carried by ball-bearings inside a boss on the sleeve $h$ and is provided with projections $n'$, adapted to interlock with projections $c^7$ on the hub and with holes or recesses $n^2$, that always engage with the horns $a^7$ on the sleeve. Horns $h^2$ are also fixed on the cone $b^5$ and are adapted to engage with the holes or recesses $n^2$ when the projections $n'$ are disengaged from the projections $c^7$.

It will readily be seen that if the sleeve $h$ is moved to the right the sleeve $a\ a'$ and the hub are locked together, so that the gearing rotates as a whole at the high speed, and that if the sleeve $h$ is moved to the left the hub and sleeve $a\ a'$ are disengaged and the sleeve $a\ a'$ is locked to the cone $b^5$ and is thus held stationary, so that the hub will rotate at the low speed, depending on the diameters of the toothed ring and the internal teeth of the hub.

It will be readily understood that when it is not desired to have the gear in the hub of a wheel the hub may be replaced by a suitable casing.

What we claim, and desire to secure by Letters Patent, is—

1. A two-speed gear consisting of an axle, a sleeve adapted to rotate on the axle and provided with an eccentric, a toothed ring adapted to rotate on the eccentric, a casing adapted to rotate on the sleeve and provided with internal teeth gearing with the toothed ring, a driving-plate mounted on the axle and provided with a hole, a pin on the toothed ring working in the hole in the driving-plate, and a means for locking the sleeve to the casing or to a fixed part of the gearing.

2. A two-speed gear consisting of an axle, a telescopic sleeve mounted on the axle and forced to rotate as a whole and provided with an eccentric, a toothed ring adapted to rotate on the eccentric, a casing adapted to rotate on the sleeve and provided with internal teeth gearing with the toothed ring, a driving-plate mounted on the axle and provided with a hole, a pin on the toothed ring working in the hole in the driving-plate, and a means for locking the sleeve to the casing or to a fixed part of the gearing.

3. A two-speed gear consisting of a stationary axle, a telescopic sleeve constructed to rotate as a whole and provided with an eccentric, a fixed bearing-surface on the axle for one end of the sleeve, a sliding bearing-surface on the axle for the other end of the sleeve, corresponding internal bearing-surfaces on the sleeve, a casing having two internal bearings one at either end, corresponding external bearing-surfaces in the telescopic sleeve, a toothed ring mounted on the eccentric, internal teeth on the casing gearing with the toothed ring, a driving-plate mounted on a bearing adapted to slide on the axle and provided with a hole, a means for forcing the sliding bearings endwise, a pin on the toothed ring working in the hole in the driving-plate, and a means for locking the sleeve to the casing or to a fixed part of the gearing.

4. A two-speed gear consisting of a stationary axle, a telescopic sleeve constructed to rotate as a whole and provided with an eccentric, a fixed bearing-surface on the axle for one end of the sleeve, a sliding bearing-surface on the axle for the other end of the sleeve, corresponding internal bearing-surfaces in the sleeve, a casing having two internal bearings one at either end, corresponding external bearing-surfaces on the telescopic sleeve, a toothed ring mounted on the eccentric, internal teeth in the casing gearing with the toothed ring, a driving-plate mounted on a sliding bearing on the axle and provided with a hole, a means for forcing the sliding bearings endwise, a pin on the toothed ring working in a hole in the driving-plate, a clutch on the axle engaging with the sleeve and adapted to prevent its backward rotation and a means for locking the sleeve to the casing.

5. A two-speed gearing consisting of a fixed axle, a sleeve adapted to rotate on the axle, a casing coaxial with the sleeve and axle and adapted to rotate, a gear connecting the casing and the sleeve, a sliding clutch coaxial with the axle and adapted to rotate and engaging with the sleeve and adapted to be engaged with either the casing or a fixed part of the gearing.

6. A two-speed gearing consisting of a fixed axle, a sleeve adapted to rotate on the axle, a casing coaxial with the sleeve and axle and adapted to rotate, a gear connecting the casing and the sleeve, a coaxial clutch adapted to prevent the backward rotation of the sleeve on the axle and a coaxial clutch adapted to lock the sleeve to the casing.

In testimony whereof we have affixed our signatures in presence of two witnesses.

FREDERICK CHARLES HASTE.
JAMES ARMSTRONG WILDING.

Witnesses:
ALBERT JONES,
HERBERT C. BOLWELL.